(12) United States Patent
Russell

(10) Patent No.: US 11,254,404 B2
(45) Date of Patent: Feb. 22, 2022

(54) PROPELLER

(71) Applicant: Thomas A. Russell, Newport Beach, CA (US)

(72) Inventor: Thomas A. Russell, Newport Beach, CA (US)

(73) Assignee: Conic Propulsion, LLC, Newport Beach, CA (US)

( * ) Notice: Subject to any disclaimer, the term of this patent is extended or adjusted under 35 U.S.C. 154(b) by 0 days.

(21) Appl. No.: 17/198,232

(22) Filed: Mar. 10, 2021

(65) Prior Publication Data

US 2021/0197939 A1  Jul. 1, 2021

Related U.S. Application Data

(63) Continuation-in-part of application No. PCT/US2020/049752, filed on Sep. 8, 2020, and a continuation-in-part of application No. 16/561,597, filed on Sep. 5, 2019, now abandoned.

(51) Int. Cl.
| | |
|---|---|
| *B63H 1/26* | (2006.01) |
| *B63H 1/20* | (2006.01) |
| *B64C 11/18* | (2006.01) |

(52) U.S. Cl.
CPC ............... *B63H 1/26* (2013.01); *B63H 1/20* (2013.01); *B64C 11/18* (2013.01)

(58) Field of Classification Search
CPC .... B63H 1/14; B63H 1/20; B63H 1/26; B63C 11/16; B64C 27/46; B64C 27/467; F03D 1/0633; F03B 3/121; F04D 29/384; F04D 29/386; F01D 5/14; F01D 5/141
USPC ........................................................ 416/243
See application file for complete search history.

(56) References Cited

U.S. PATENT DOCUMENTS

| | | | | |
|---|---|---|---|---|
| 4,135,858 | A * | 1/1979 | Entat ................... | B01F 7/00341 416/223 R |
| 4,959,571 | A * | 9/1990 | Yasumoto ............ | F04D 25/0613 310/63 |
| 7,637,722 | B1 * | 12/2009 | Koepsel .................. | B63H 1/26 416/238 |
| 8,770,941 | B2 * | 7/2014 | Smith .................... | F03D 1/0608 416/223 R |
| 2007/0243064 | A1 * | 10/2007 | Nakano ................. | F04D 29/384 416/63 |
| 2009/0314698 | A1 * | 12/2009 | Higbee ............... | B01F 7/00341 210/150 |

* cited by examiner

*Primary Examiner* — Woody A Lee, Jr.
*Assistant Examiner* — Justin A Pruitt
(74) *Attorney, Agent, or Firm* — Crockett & Crockett, PC; K. David Crockett, Esq.

(57) ABSTRACT

The blades of the propeller are characterized by a blade center axis which corresponds to a generator line of a cone to which the blade, or blade thrust surface, conforms. The propeller hub is fixed to the blade at the root, in line with the blade center axis, such that the hub axis and blade center axis lie in the same plane, and the leading edge of the blade is positioned forward (referring to the upstream direction of movement caused by the propeller) of the trailing edge of the blade.

17 Claims, 4 Drawing Sheets symbol for forward view of hub

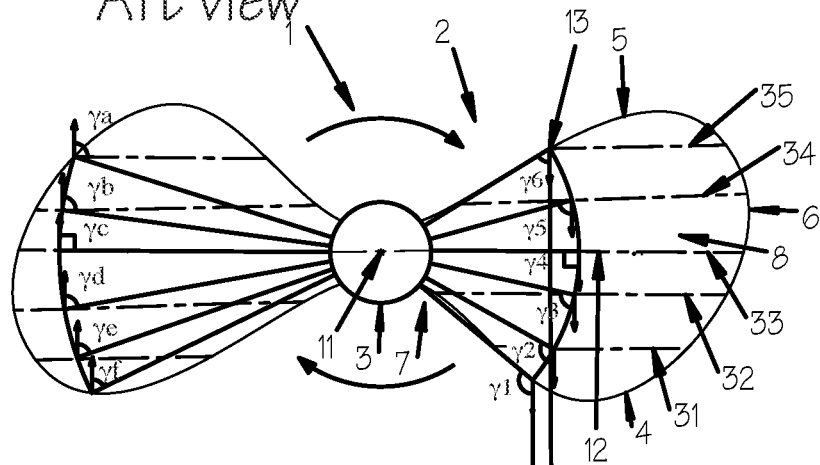
Fig. 8  Aft view
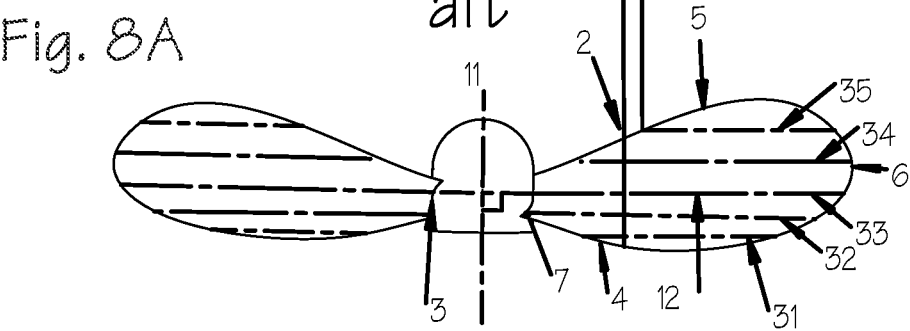
Fig. 8A  aft / forward  Side view
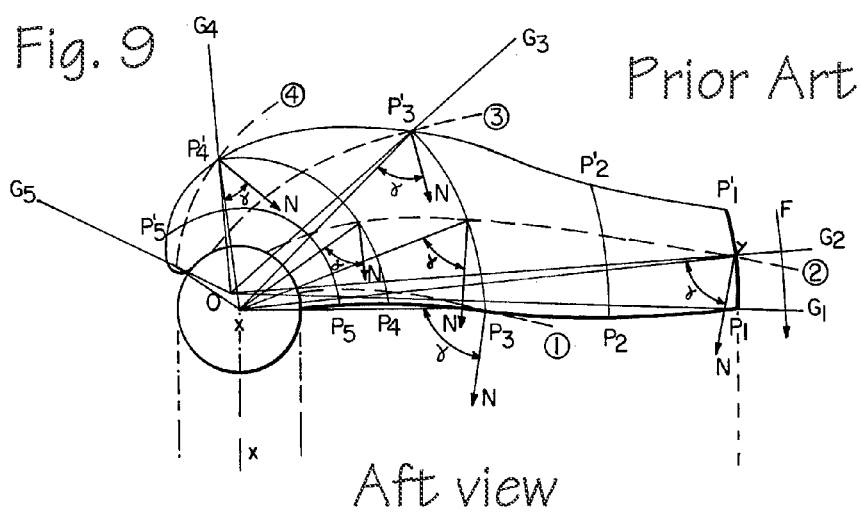
Fig. 9  Prior Art  Aft view

PROPELLER

This application is a continuation-in-part of U.S. application Ser. No. 16/561,597, filed Sep. 5, 2019, pending, and a continuation-in-part of PCT Application PCT/US2020/049752, filed Sep. 8, 2020, pending.

FIELD OF THE INVENTIONS

The inventions described below relate to the field of nautical and aeronautical propellers.

BACKGROUND OF THE INVENTIONS

Most propellers use blades which conform to the shape of a screw. These are referred to as helicoidal propellers. Helicoidal propellers create a large amount of turbulence compared to the thrust they generate, and various modifications are employed to decrease turbulence and increase thrust. Other forms of propellers have been proposed, but not widely adopted.

Conical propellers described in the prior art include Entat, Method of Producing Propeller Blades and Improved Propeller Blades Obtained by Means of this Method, U.S. Pat. No. 4,135,858 (Jan. 23, 1979). Entat's propeller blades conform to the surface of a reference cone, and the axis of rotation of his propeller is coincident with a vertex of the reference cone. The blades of Entat span a large circumference of the reference cone (about 135° at the root). Moreover, the faces of Entat's propeller blades are angled toward the axis of rotation. This results in large inefficiencies as much of the fluid flow caused by rotation of the propeller blades is directed radially inward, rather than axially away from the thrust surface.

SUMMARY

The propellers described below provide for increased thrust and decreased turbulence with blades shaped to conform to the surface of a cone. Each blade is characterized by a blade center axis which corresponds to a generator line of a cone to which the blade, or blade thrust surface, conforms. The propeller hub is fixed to each blade at the root, in line with the blade center axis, such that the hub axis and blade center axis lie in the same plane, and the leading edge of the blade is positioned forward (referring to the upstream direction of movement caused by the propeller) of the trailing edge of the blade.

The conical propeller may be modified such that each blade subtends 90° or less of the reference cone circumference, and more preferably 45° or less of the reference cone circumference. The conical propeller may also be modified such that the blade's axis of rotation intersects a generator line at a distance of at least half the length of the distance from the blade root to tip as measured along the generator line that passes through the axis of rotation, and up to approximately the length of the blade's radial axis away from the cone's vertex.

BRIEF DESCRIPTION OF THE DRAWINGS

FIGS. 8 and 8A illustrate the form of the propeller blades in relation to fluid flow induced by the propeller.
FIG. 9 illustrates a prior art propeller blade.

DETAILED DESCRIPTION OF THE INVENTIONS

Figure 1:
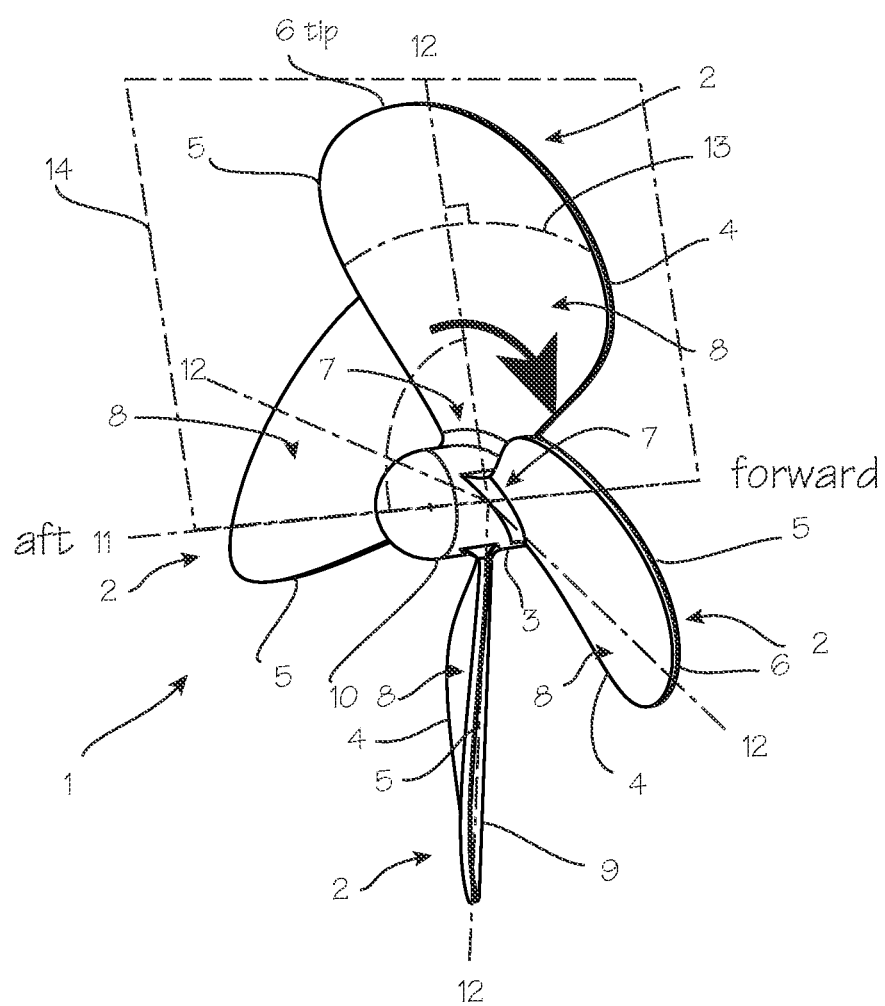
FIG. 1 is an aft perspective view of a marine propeller.
Figure 2:
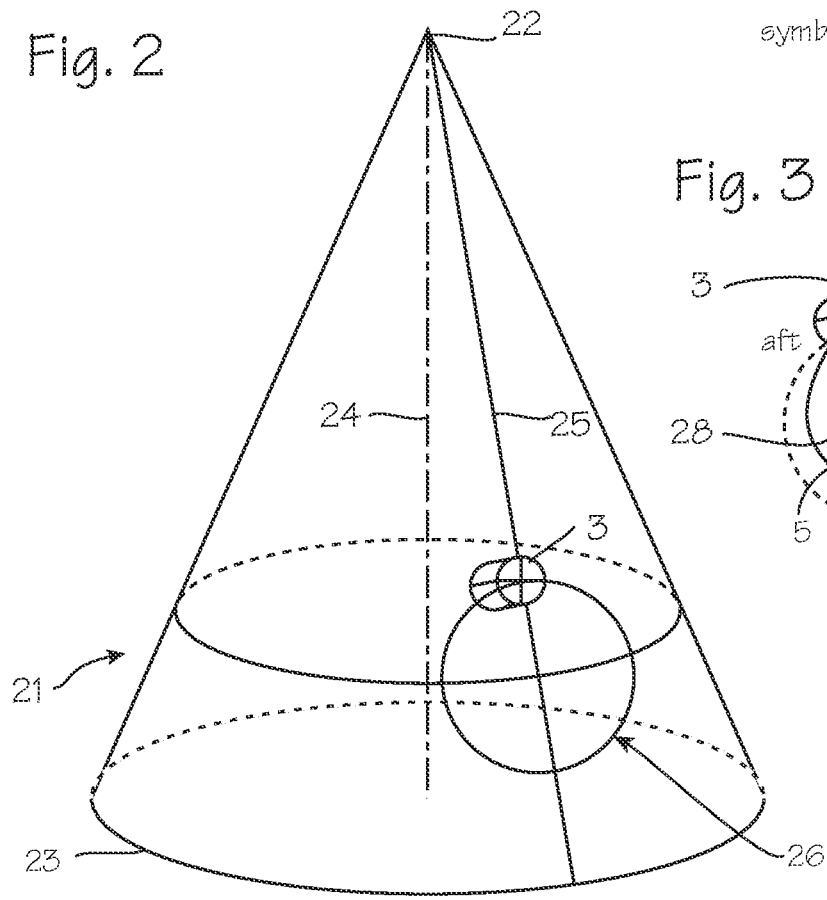
FIG. 2 illustrates the form of the propeller blades in relation to a hypothetical cone used to define features of the blades, from a forward perspective.
Figure 6:
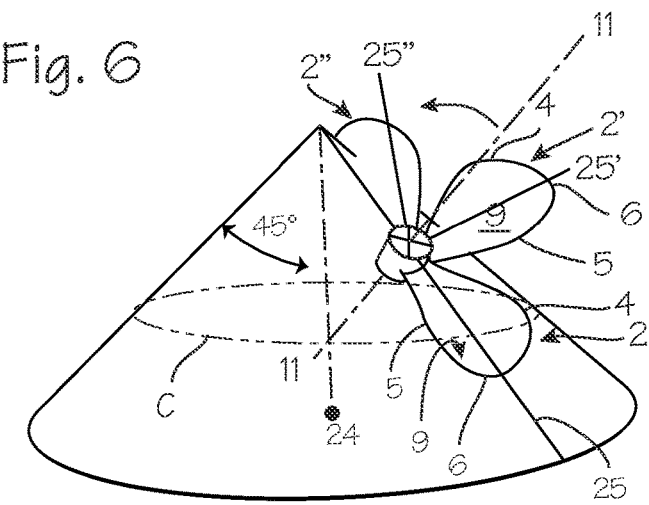
FIG. 6 provides an additional illustration of the form of the propeller blades in relation to a hypothetical cone used to define features of the blades, from a forward perspective.
Figure 7:
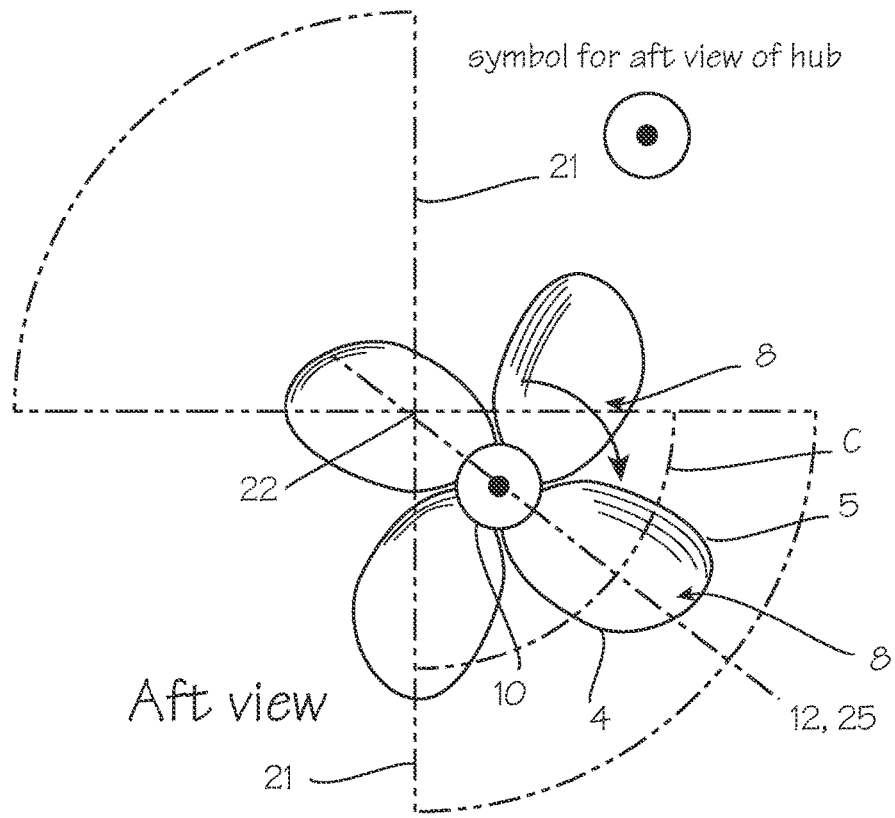
FIG. 7 illustrates the form of the propeller blades in relation to a hypothetical cone used to define features of the blades, in an aft view of the propeller.

FIG. 1 is an aft perspective view of a marine propeller with blades having surfaces conforming to the surface of a cone. The propeller 1 includes blades 2 disposed about and mounted on a hub or boss 3. Each blade is characterized by a leading edge 4, a trailing edge 5, a tip 6, a root 7, a thrust surface 8 (also referred to as the blade face, the pressure surface or the aft surface), and a blade back (the forward surface or suction surface) 9. The hub is typically terminated in a cap 10, and is characterized by a hub axis 11. The hub axis is the axis of rotation of the propeller. As shown in the illustration, the leading edge of each blade is forward of the trailing edge. Each blade is characterized by a blade center axis 12 (also referred to as the radial axis), which may or may not be perpendicular to the hub axis 11 (the blade center axis may or may not be located in the geometric center of the blade). The blade center axis, or radial axis, lies on the generator line that goes through the axis of rotation of the propeller. (The radial axis in this illustration corresponds to the generator line of a cone used as a reference to define aspects of the blade, as shown in FIGS. 2, 6 and 7). A leading-to-trailing line 13, perpendicular to the radial axis 12, is referred to herein as a pitch line. The hub axis 11 and the blade center axis 12 of blade lie in plane 14.

FIG. 2 illustrates the form of the propeller blades in relation to a reference cone used to define features of the blades, from a forward perspective. The reference cone 21 is characterized by a vertex (apex) 22, a round (preferably circular) base 23, a vertical axis 24 and any number of generator lines exemplified by generator line 25. The cone may be a right cone (the vertical axis 24 passes through the center of the circular base at a right angle), or an oblique cone with a circular or elliptical base, though a right circular cone is preferred because it can provide parabolic curvature on the blade surfaces. In reference to the reference cone, the thrust surface of the blade conforms to a section of the reference cone, such as section 26, centered on the generator line 25, which establishes the radial axis 12 of the blade shown in FIG. 1. The hub 3 is shown in relation to the reference cone, intersecting the surface of the cone and centered on the same generator line as the section of the reference cone. The hub and hub axis are preferably displaced from the vertex of the reference cone, toward the section 26, but may be coincident with the vertex. The hub axis 11 may be oriented perpendicular to the surface of the reference cone so that it intersects the generator line at a right angle and also intersects the cone axis (at an angle dependent on the vertex angle) or angled relative to the surface of the cone (left or right about the generator line) while intersecting the generator line at a right angle (this provides the twist necessary for a symmetric blade), and may also be angled relative to the radial axis/generator line while also intersecting the cone axis 24 (this provides rake) and may also be angled relative to the radial axis/generator line while also not intersecting the cone axis 24 (this provides twist and rake). Thus, the hub axis 11 may intersect the generator line at a right angle, or at an acute or obtuse angle relative to the thrust surface of the blade or corresponding section of the reference cone. (Correspondingly, the resulting blade may be raked forward or aft on the hub.) Also, the hub axis may intersect the cone axis 26 (lie in the same plane) or depart from the cone axis. (Correspondingly, the resulting blade will be twisted or rotated about the blade center axis relative to the hub axis, to set the leading edge forward of the trailing edge). Each blade may be rotated about its generator line, or trimmed asymmetrically about its blade center axis, such that its average pitch angle relative to the hub is different from that which it would have had without such rotation or trimming.

Figure 3:
FIGS. 3, 4 and 5 illustrate variations in blade outlines.
Figure 3:
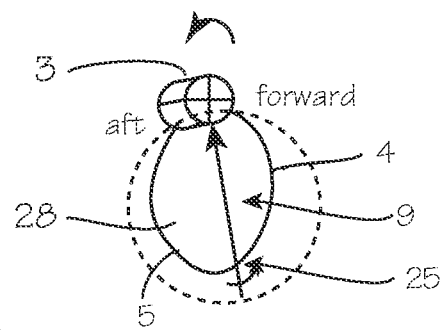
Figure 4:
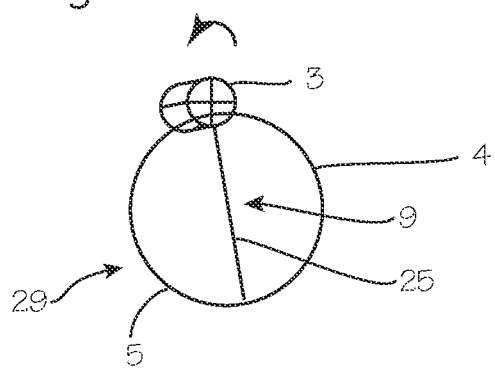
Figure 5:
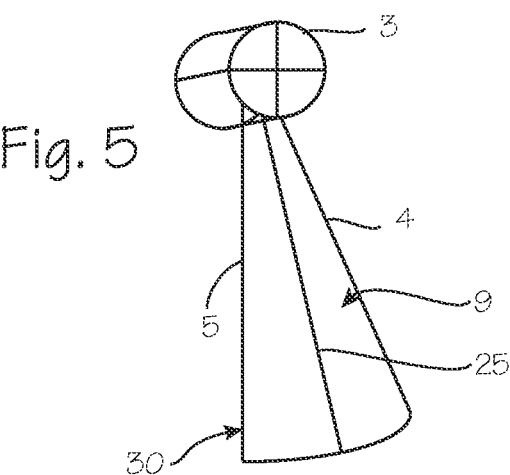

FIGS. 3, 4 and 5 illustrate possible blade outer contours. The blade outline may be elliptical (28) as shown in FIG. 3, circular (29) as shown in FIG. 4, or wedge shaped (30), as a wedge bounded by two generator lines spaced from the generator line 25 with the straight-cut tip as shown, in FIG. 5. The blade outline may be slightly or highly skewed, arc-tipped, scimitar-shaped, or any other shape that provides thrust.

FIG. 6 provides an additional illustration of the form of the propeller blades in relation to a hypothetical cone used to define features of the blades, from a forward perspective, showing how one blade would appear on the reference cone when the propeller is assembled. In this view, several of the blades 2, 2' and 2" are shown, with one blade 2 superimposed on the surface of the reference cone 21, which in this illustration is a 90° right cone, with a 45° angle between the vertical axis 24 and the generator line 25. This Figure shows the hub axis 11 which is perpendicular to the generator line 25, but does not intersect the vertical axis 24. This makes clear that, for blades conforming to the surface of a right cone, planes parallel to the hub axis 11 will intersect the thrust surfaces along parabolic curves. The blades 2' and 2" are shown projecting out of the surface of the reference cone, along with corresponding generator lines 25' and 25".

FIG. 7 illustrates the form of the propeller blades in relation to a hypothetical cone used to define features of the blades, in an aft view of the propeller. In this view, the blade 2 is shown with its radial axis 12 perpendicular to, and/or coplanar with the hub axis, and as mentioned in relation to FIG. 1, disposed on the same generator line that defines the blade thrust surface 8. This is an aft view, looking at the thrust surface of the blades. As shown in both FIGS. 6 and 7 the vertex of the reference cone is spaced from the propeller axis, and is located opposite the propeller axis relative to each blade. The vertex of the reference cone is spaced from the axis of rotation, and is on the opposite side of the axis of rotation from each blade. The vertex of the reference cone may be spaced from the propeller axis by a distance equal to half the length of a greatest distance from the blade root to the blade tip as measured along the generator line that passes through the axis of rotation and up to approximately the length said greatest distance from the blade root to the blade tip.

Additionally it is preferable that the axis of rotation be sufficiently remote from the vertex of the cone to allow the blade root to be wide enough for structural strength without excessive curvature. FIGS. 6 and 7 illustrate a form of propeller blade whose reference cone is a 90° right circular cone and whose thrust surface conforms to the cone's curvature remote from the cone's vertex such that the blade's axis of rotation intersects a generator line at a distance of at least half the length of the distance from the blade root to tip as measured along the generator line that passes through the axis of rotation (FIG. 7), and up to approximately the length of the blade's radial axis away from the cone's vertex (FIG. 6) or more (FIG. 2). Thus, the blade's axis of rotation intersects a generator line at a distance from the vertex of the reference cone of between half the length of a greatest distance from the blade root to the blade tip as measured along the generator line that passes through the axis of rotation and up to approximately the length said greatest distance from the blade root to the blade tip.

The blade covers 90° or less of the circumference of the cone (the circumference of the cone, along a plane parallel to the base) or, correspondingly, less than a quarter cone, as determined by the angle between two generator lines of the cone that do not intersect the blade. Preferably, the axis of rotation and generator line through it are at right angles to each other.

The reference cones of FIGS. 6 and 7 are characterized by a circumference, defined as the circular arc created by intersection of a plane perpendicular to the vertical axis 24 of the cone. The circumference of the cone varies with distance from the vertex. Preferably the blade subtends 90° or less of the reference cone circumference as illustrated in FIG. 7, i.e. covers a quarter cone or less of the reference cone circumference, more preferably 45° or less, or one eighth cone, as determined between two generator lines on the edges of the blade. Wider coverage of the cone's surface rotates the fluid and thus is inefficient. An angle whose vertex lies on a plane perpendicular to the axis of rotation at a point where it intersects the thrust surface, and on an imaginary cylinder concentric with the axis of rotation, with one side of the angle in the plane of rotation and perpendicular to the radius, and the other side tangent to the imaginary cylinder at the point of intersection with the thrust surface, preferably should be 90° or less apart from any other such angle at the same radius on the thrust surface, more preferably 45° or less. Thus, at all radiuses along the length of the blade the blade has a width that is 90° or less of the circumference of the reference cone at height on the reference cone corresponding to that radius along the length of the blade. Thus, at a first radius along the length of the blade, the blade has a width that is 90° or less of the circumference of the reference cone at a height on the reference cone corresponding to that radius along the length of the blade, and at no second radius along the length of the blade is the width greater than 90° of the circumference of the reference cone at a height on the reference cone corresponding to that second radius.

As described above, the propeller comprises a hub operable to rotate about an axis of rotation in a direction of rotation, characterized by a forward end and an aft end, and one or more of the blades each characterized by a root, a tip, a leading edge and a corresponding trailing edge, and a thrust surface. The thrust surface of each blade conforms to a surface of a reference cone characterized by a vertex and a base, and a generator line, wherein a radial axis extending radially from the root of the blade to or toward the tip area of the blade corresponds to a generator line of the reference cone, and the root of the blade is fixed to the hub such that the axis of rotation lies in the same plane as the radial axis of the blade. The axis of rotation and the radial axis of the blade may be substantially perpendicular or set at an angle of 45° or more. Correspondingly, the plane of rotation perpendicular to the axis of rotation may be substantially parallel or set at an angle of 45° or less either forward or aft (a rake angle). The leading edge of each blade is forward of its corresponding trailing edge. The average pitch angle between the leading and trailing edges may be 45° or less. The pitch angle may increase from leading to trailing edge, and decrease from root to tip.

As a result of the relationship between the hub and blade, a line on the thrust surface, along the axis of the blade, is a straight line corresponding to a generator line of the cone, and the shape of the blade thrust surface, along a leading-to-trailing line perpendicular to the vertical axis of the reference cone, is a circular arc. Where the hub is displaced from the vertex of the reference cone, as shown in FIGS. 2, 6 and 7, there may be only a single straight line corresponding to a generator line of the cone on the thrust surface that goes through the hub. The shape of the blade thrust surface, along a leading-to-trailing line perpendicular to the reference cone vertical axis, where the reference cone is a right cone, is a circular arc.

In terms of the reference cone, the blade is disposed with respect to the hub axis so that a plane containing the propeller axis (that is, the propeller axis lies in that plane) will also contain a generator line (that is, the generator line lies in that plane) of the cone which corresponds to a long axis of the blade, such that the blade may have circular or conical curvature in transverse directions, across the thrust surface, between the leading and trailing edges of the blade and substantially no curvature in a direction radial of the blade. The blades may be non-raked, such that the generator line of the cone is perpendicular to the hub axis, or raked such that it is angled relative to the hub axis such that the tip of the blade is forward or aft of the root of the blade. The blade back of each back may have various curvatures, for example to create an airfoil cross section of the blade to increase suction. Each blade may be sharpened, chamfered or faired on its edges, or thickened, strengthened, or faired at or near its hub or boss.

FIGS. 8 and 8A illustrate the form of the propeller blades in relation to fluid flow in the plane of rotation induced by the propeller, while FIG. 9 illustrates a prior art propeller. FIG. 8 shows the propeller 1 with blades as described above, including one of the blades 2, the hub 3, showing the leading edge 4, the trailing edge 5, the tip 6, the root 7 and the thrust surface 8. This is an aft view, with the hub axis 11 perpendicular to planes parallel to the page. The leading to trailing line (the pitch line) 13 is also shown, along with the blade center axis 12. The blade shape described in reference to the previous Figures results in gamma angles as shown in FIG. 8. "The gamma angle $\gamma$ is the angle between a radial line extending from the hub axis to a point on the blade face, and a line perpendicular to a "transverse plane intersection" line on the thrust surface of the blade (an imaginary line defined by the intersection of a plane, perpendicular to the axis of rotation, with the thrust surface (the whole aft-facing surface). This transverse plane intersection line lies in a plane perpendicular to the axis of rotation. Various transverse plane intersection lines 31 through 35 are shown in FIGS. 8 and 8A, where line 31 is forward of line 32, which is forward of line 33, and so on. The gamma angles are demonstrated at arbitrary points along the face of the blade. As worded in the claims, the gamma angle is the angle between the radial axis and a vector in the direction of rotation, where said vector is perpendicular to an "intersection" line formed on the blade face by intersection of a plane perpendicular to the axis of rotation, and the vector lies in the intersecting plane. A gamma angle of zero would point directly inward to the hub axis along the radial line, and a gamma angle of 180° would point directly away from the hub axis.

The gamma angle varies along the pitch line 13. At the leading edge, and near the leading edge, as shown in FIG. 8, the gamma angles $\gamma_1$, $\gamma_2$, $\gamma_3$, etc. are obtuse, greater than 90° from the inner segment of the radial line, and the gamma angles gradually decrease toward the trailing edge of the blade, such that the gamma angles $\gamma_5$ and $\gamma_6$, for example, are acute toward and at the trailing edge. Thus, at the leading edge, the gamma angle formed at any given radius from the hub/axis of rotation is greater than 90°, while at the trailing edge, the gamma angle formed at any given radius from the hub/axis of rotation is less than 90°. Along the pitch line, moving from the leading edge to the trailing edge, the gamma angle gradually lessens from obtuse to acute. At a midline, the gamma angle $\gamma_4$ will be 90° ($\gamma_4$ is arbitrarily assigned the subscript 4, merely because it is the fourth, of an infinite number of gamma angles, depicted in the figure). This midline is shown in FIG. 8 as line 33, the blade center axis, along which the gamma angles, such as $\gamma_4$, are 90°. For a blade conforming to the surface of a cone, and a hub axis remote from the reference cone vertex, this blade center axis will be the only line corresponding to a generator line of the reference cone (that is, the only line that will pass through both the hub axis and the vertex of the reference cone). The blade on the left side of FIG. 8 is annotated with gamma angles $\gamma_a$, $\gamma_b$, $\gamma_c$, $\gamma_d$, $\gamma_e$, and $\gamma_f$ which are comparable to the gamma angles $\gamma_1$, $\gamma_2$, $\gamma_3$ etc. shown on the blade on the right side of the propeller.

FIG. 9 represents a prior art propeller blade disclosed in Entat, U.S. Pat. No. 4,135,858, demonstrating the distinguishing aspects of FIG. 8. In FIG. 9, the gamma angles are acute at the leading edge of the blade, and become progressively more acute toward the trailing edge.

Though the inventions have been illustrated with four-bladed marine propellers, the propeller may be made with any plurality of blades (or even a single blade), and may be adapted for aeronautical use. The description above has been provided in reference to right-hand propellers (rotating clockwise when viewed from aft), but the same principles apply to left-hand propellers.

If the axis of rotation is at 90 degrees to the generator line that runs through it, and the reference cone vertex angle is 90 degrees, planes parallel to the axis of rotation will cut the reference cone and blade along parabolic lines, irrespective any twist of the blade around the generator line. Thus, blades based on 90-degree reference cones with axes of rotation perpendicular to the generator line through them are often preferred.

If the axis of rotation is at 90° to the generator line through it, and the reference cone vertex angle is acute, planes parallel to the axis of rotation will cut the reference cone and blade along elliptical lines. If the axis of rotation is at 90° to the generator line through it, and the reference cone vertex angle is obtuse, planes parallel to the axis of rotation will cut the reference cone and blade along hyperbolic lines.

Blades with a generator line through the hub as the blade center axis will have gamma angles that transition from obtuse to acute across the blade (from the leading edge to the trailing edge). These blades are advantageous because their gammas are open to receive the flow at the leading edge and accelerate the flow axially downstream as the gamma angles narrow, while the straight blade center axis improves structural strength and balance.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

I claim:

1. A propeller comprising:
a hub operable to rotate about an axis of rotation in a direction of rotation, characterized by a forward end and an aft end; and
one or more blades characterized by a root, a tip, a leading edge and a corresponding trailing edge, and a thrust surface; wherein, for each of the one or more blades
the thrust surface conforms to a surface of a reference cone characterized by a vertex, a base, a vertical axis, and a reference cone circumference, said circumference defined by an intersection of a plane perpendicular to the vertical axis and passing through the reference cone surface and a plurality of generator lines; wherein
a blade center axis extending radially from the root of each blade is coincident with one generator line of the plurality of generator lines of the cone, and the root of each blade is fixed to the hub such that the axis of rotation intersects said one generator line and is coplanar with the blade center axis of each blade; wherein
a first gamma angle, being an angle between a first radial line along the blade center axis and a vector in the direction of rotation, is 90° along the blade center axis, where said vector is perpendicular to an imaginary line formed on the thrust surface by the intersection of a first transverse plane perpendicular to the axis of rotation, and said vector lies in said plane perpendicular to the axis of rotation; wherein
along a second radial line, said second radial line extending from the hub axis to a point on the thrust surface at the leading edge of each of the one or more blades, a second gamma angle formed between said second radial line and a line perpendicular to a second transverse plane intersection line on the thrust surface of the blade is greater than 90°; and
along a third radial line, said third radial line extending from the hub axis to a point on the thrust surface at the trailing edge of each of the one or more blades, a third gamma angle formed between said third radial line and a line perpendicular to a third transverse plane intersection line on the thrust surface of the blade is less than 90°.

2. The propeller of claim 1 wherein:
wherein said blade center axis is remote from the reference cone vertex, and said generator line of the plurality of generator lines passes through the axis of rotation at 90° to the axis of rotation.

3. The propeller of claim 1 wherein:
the vertex of the reference cone is spaced from the axis of rotation, and is located opposite the axis of rotation relative to the tip and the root of each blade.

4. The propeller of claim 1 wherein:
the vertex of the reference cone is spaced from the axis of rotation, and is on the opposite side of the axis of rotation from each blade.

5. The propeller of claim 1 wherein:
the vertex of the reference cone is spaced from the axis of rotation by a distance equal to half the length of the greatest distance from the blade root to the blade tip, and up to approximately the length of said greatest distance from the blade root to the blade tip.

6. The propeller of claim 1 wherein:
at a first radius along the blade center axis, the blade has a width that is 90° or less of the circumference of the reference cone at a height on the reference cone corresponding to that radius, and at no second radius along the blade center axis is the width greater than 90° of the circumference of the reference cone at a height on the reference cone corresponding to that second radius.

7. The propeller of claim 1 wherein:
the width of the blade along the circumference of the reference cone is no greater than 90° of the circumference at any height on the reference cone.

8. The propeller of claim 1 wherein:
the axis of rotation intersects a generator line of the plurality of generator lines at a distance of at least half the length of the distance from the blade root to tip as measured along the blade center axis, and up to approximately the length of the blade's center axis, away from the cone's vertex.

9. The propeller of claim 1 wherein:
the axis of rotation and each blade generator line of the plurality of generator lines through such axis of rotation are substantially perpendicular.

10. The propeller of claim 1 wherein:
the axis of rotation and each blade generator line of the plurality of generator lines through such axis of rotation are set at an angle of 45° or more.

11. The propeller of claim 1 wherein:
the axis of rotation and the blade center axis of each blade are substantially perpendicular.

12. The propeller of claim 1 wherein:
the axis of rotation and the blade center axis of each blade are set at an angle of 45° or more.

13. The propeller of claim 1 wherein
the average pitch angle between leading and trailing edges is 45° or less.

14. The propeller of claim 1 wherein:
a line on the thrust surface, along the blade center axis of each blade, is a straight line corresponding to a generator line of the line plurality of generator lines of the cone.

15. The propeller of claim 1 wherein:
a leading-to-trailing line on the thrust surface of each blade, perpendicular to the vertical axis of the reference cone, is a circular arc.

16. The propeller of claim 1 wherein:
the blade is disposed such that the blade center axis is angled relative to the axis of rotation such that the tip of the blade is forward or aft of the root of the blade.

17. A propeller comprising:
a hub operable to rotate about an axis of rotation in a direction of rotation, characterized by a forward end and an aft end; and
one or more blades each characterized by a root, a tip, a leading edge and a corresponding trailing edge, and a thrust surface; wherein
the thrust surface of each blade conforms to a surface of a reference cone characterized by a vertex remote from said hub, a base, a vertical axis, and a reference cone circumference, said circumference defined by an intersection of a plane perpendicular to the vertical axis and passing through the reference cone surface and a plurality of generator lines; wherein
a blade center axis extending radially from the root of each blade is coincident with a generator line of the plurality of generator lines of the cone, and the root of each blade is fixed to the hub such that the axis of rotation intersects said generator line and is coplanar with the blade center axis of each blade; wherein a gamma angle, being the angle between a radial line extending from the axis of rotation and a vector extending from the blade thrust surface, where said vector has a directional component in the direction of rotation, and said vector is perpendicular to an imaginary line formed on the thrust surface by the intersection of a plane perpendicular to the axis of rotation, and said imaginary line, radius and vector lie in said plane; wherein along a portion of the leading edge forward of the blade center axis of each of the one or more blades, the gamma angle formed with any given radius from the axis of rotation is greater than 90°; and at the blade center axis of each of the one or more blades, the gamma angle formed with any given radius from the axis of rotation is 90°; and along a portion of the trailing edge aft of the blade center axis of each of the one or more blades, the gamma angle formed with any given radius from the axis of rotation is less than 90°.

\* \* \* \* \*